United States Patent Office 3,776,960
Patented Dec. 4, 1973

3,776,960
PREPARATION OF BIS(PERFLUOROALKYL-SULFONYL)METHANES
Robert J. Koshar, Lincoln Township, Washington County, and Ronald A. Mitsch, Little Canada, Minn., assignors to Minnesota Mining and Manufacturing Company, St. Paul, Minn.
No Drawing. Filed Dec. 9, 1971, Ser. No. 206,518
Int. Cl. C07c *147/02*
U.S. Cl. 260—607 A                              9 Claims

ABSTRACT OF THE DISCLOSURE

A process is provided for obtaining improved yields of bis(perfluoroalkylsulfonyl)methanes by the reaction of perfluoroalkanesulfonyl fluorides with methylmagnesium halide using a non-reactive ether forming an oxonium ion in aqueous sulfuric acid having an ionization constant as expressed by pKa of greater than −3.3.

---

This invention relates to a process for obtaining bis-(perfluoroalkylsulfonyl)methanes by the reaction of perfluoroalkanesulfonyl fluorides with methyl-magnesium halide and particularly to a process effected in solvents which permit achieving relatively high yields.

The preparation of the lowest member of the homologous series of bis(perfluoroalkylsulfonyl)methanes, specifically bis(perfluoromethylsulfonyl)methane, is described by Brice and Trott in U.S. Pat. No. 2,732,398 (1956) and by Gramstad and Haszeldine in J. Chem. Soc., 4069 (1957). Brice and Trott obtained methyl perfluoromethly sulfone and bis(perfluoromethylsulfonyl)methane in yields of 21.3% and 5.2% of the theoretical amount, respectively, from one equivalent weight of perfluoromethanesulfonyl fluoride and 2 equivalent weights of methylmagnesium iodide in refluxing (34.6° C.) diethyl ether. Gramstad and Haszeldine obtained methyl perfluoromethyl sulfone and bis(perfluoromethylsulfonyl)methane in yields of 12% and 7% respectively from one equivalent weight of perfluoromethanesulfonyl fluoride and 2 equivalent weights of methylmagnesium iodide that had been sealed cold in a reaction tube with diethylether and allowed to warm to room temperature and then held at 20° for 12 hours before isolation of products.

The preparation of higher bis(perfluoroalkylsulfonyl) methane homologs as well as the lower homologs is described by Heine in U.S. Pat. No. 3,281,472. From the example given in this patent, yields of butyl perfluorooctyl sulfone and 1,1-bis(perfluorooctylsulfonyl)butane of 8.3% and 13.2% respectively, are obtained by the reaction of one equivalent weight of butyllithium with one equivalent weight of perfluorooctanesulfonyl fluoride in diethylether at 0° C.

It is thus apparent that conversions of perfluoroalkanesulfonyl fluorides to bis(perfluoroalkylsulfonyl)methanes have been very poor, not even up to 15%, so that the cost of the material has necessarily been prohibitively high.

It is an aim of this invention to provide a method whereby bis(perfluoroalkylsulfonyl)methanes are obtained in improved yields. It is another aim of this invention to provide a method whereby bis(perfluoroalkylsulfonyl)methanes are obtained in yields of 40 to 90% of the theoretical amount. Other aims and objects of the invention will become apparent from the disclosure herein.

It has been found that bis(perfluoroalkanesulfonyl)-methanes having the general structural formula $$(R_fSO_2)_2CH_2$$

wherein $R_f$ is a monovalent fluorinated straight or branched chain alkyl radical containing 1 to 18 carbon atoms fully fluorinated except for not more than one of hydrogen, oxygen, trivalent nitrogen or chlorine atoms for each two carbon atoms, said hydrogen and chlorine atoms being non-reactive to methyl magnesium halide and oxygen and nitrogen being bonded exclusively to carbon, are prepared in yields of 40 to 90% of theoretical by reaction of a perfluoroalkanesulfonyl fluoride of the general structural formula $$R_fSO_2F$$

wherein $R_f$ is as defined above with 1.2 to 7 or more and preferably 2.5 to 3.5 equivalents of methyl magnesium halide at temperatures in the range of from about −20° C. to about 100° C. in a solvent system comprising at least about 40% by volume of an ether forming an oxonium ion in aqueous sulfuric acid having an ionization constant as expressed by pKa of greater than about −3.3 and preferably greater than about −3.0 when determined by solvent extraction and gas chromatograhpy.

Examples of perfluoroalkanesulfonyl fluorides include perfluoromethanesulfonyl fluoride, perfluoroethanesulfonyl fluoride, perfluorobutanesulfonyl fluoride, perfluorohexanesulfonyl fluoride, perfluorooctanesulfonyl fluoride, perfluorododecanesulfonyl fluoride, perfluorooctadecanesulfonyl fluoride, perfluorocyclohexylmethanesulfonyl fluoride, 3-(perfluoromerpholino)perfluoropropanesulfonyl fluoride, 3-(perfluoropiperidino)perfluoropropanesulfonyl fluoride, perfluoropropane-2-sulfonyl fluoride, 2-perfluoroethoxyethanesulfonyl fluoride, $Cl(C_2F_4)SO_2F$, $$Cl(C_2F_4)_2SO_2F, Cl(C_2F_4)_4SO_2F, H(C_2F_4)SO_2F,$$

$H(C_2F_4)_4SO_2F$ and the like.

Methylmagnesium halides that may be used are methylmagnesium chloride, methylmagnesium bromide and methylmagnesium iodide. The preferred methylmagnesium halide is methylmagnesium chloride.

It is a novel feature of the present process that the reaction, which is in theory capable of producing mono-, bis- and tris-(perfluoroalkylsulfonyl)methanes, produces, predominantly the middle member of the series, the bis-(perfluoroalkylsulfonyl)methanes and is thus different in kind from the process of the prior art above noted. The preferred process of the invention employs perfluoroalkanesulfonyl fluorides of the formula $$C_nF_{2n+1}SO_2F$$

wherein $n$ is 1 to 18.

Non-reactive ethers that may be used in the process of our invention are ethers that do not react under the conditions of the process with themselves or the components of the reaction. Suitable ethers are those forming oxonium ions in aqueous sulfuric acid having an ionization constant as expressed by pKa of greater than about −3.3 and preferably greater than about −3.0 when determined by solvent extraction and gas chromatography in accordance with the method described by E. M. Arnett in a series of three papers, J. Am. Chem. Soc., 84, 1674–1680, 1680–1684, 1684–1688 (1962). Examples of suitable ethers and their pKa values are listed in Table 1.

TABLE 1

Examples of ethers suitable in the process of the invention and their dissociation constant

| Ether: | pKa |
|---|---|
| 1,2-dimethoxyethane | −3.27 |
| Dioxane | −3.16 |
| Methyl t-butylether | −2.84 |
| 7-oxa[2.2.1]bicycloheptane | −2.80 |
| Tetrahydropyran | −2.79 |
| 2-methyltetrahydrofuran | −2.67 |
| Trans-2,5-dimethyltetrahydrofuran | −2.65 |
| Cis-2,5-dimethyltetrahydrofuran | −2.44 |
| Tetrahydrofuran | −2.08 |
| Hexamethyleneoxide | −2.02 |

At least 40% of the solvent must be such as ether but diluents may be other ethers or even hydrocarbon or chlorinated solvents as benzene, heptane, petroleum ether, ligroin, methylene chloride which are inert toward reactants and products.

Bis(perfluoroalkylsulfonyl)methanes are prepared by (1) reacting one gram-molecular weight of perfluoroalkanesulfonyl fluoride with from 1.2 to 7 or more and preferably 2.5 to 3.5 gram-molecular weights of methylmagnesium halide in about 300 to 2000 ml. and preferably about 500 to 1000 ml. of non-reactive ether forming an oxonium ion in aqueous sulfuric acid having a pKa greater than about −3.3 at from −20° C. to about 100° C. for 1 to 3 hours or more and (2) hydrolyzing organic magnesium halide and isolating the reaction products. The initial concentration may be up to about 3 molar with respect to perfluoroalkanesulfonyl fluoride but decreases as reaction proceeds to nil. The concentration is limited by solubility and by the nature of the particular compound, whether liquid or gas. The concentration of methylmagnesium halide is usually held sufficiently low that it is completely dissolved.

Generally, the reaction is carried out in a reaction vessel equipped to exclude atmoshperic moisture. The reaction may be carried out at atmospheric pressure or under autogenous pressure using a pressure relief valve to remove methane formed in the reaction. The perfluoroalkanesulfonyl fluoride may be added either as a gas (perfluoromethanesulfonyl fluoride boils at about −20° C.), or as a liquid, or as a solution in ether to the methylmagnesium halide in the reaction vessel (herein designated "normal" addition) or in the "reverse" reaction the methylmagnesium halide in solution in a non-reactive ether may be added to the perfluoroalkanesulfonyl fluoride in the reaction vessel.

Generally, when the "normal" addition procedure is followed, the ratio of methylmagnesium halide to perfluoroalkanesulfonyl fluoride may be from about 1.5 to 7 or higher and preferably 2.5 to 3.5 and wherein the "reverse" procedure is followed, the ratio may be from about 1.2 to 7 or higher and preferably 2.5 to 3.5. Ratios less than 1.5 for the "normal" procedure and less than 1.2 for the "reverse" procedure result in yields of bis(perfluoroalkylsulfonyl)methanes of less than 40%.

Generally, at least about 40% of the nonreactive ether system must be a nonreactive ether forming an oxonium ion in aqueous sulfuric acid having a pKa greater than about −3.3. When the nonreactive ether system contains less than 40% of such an ether or whenethers forming oxonium ions having pKa's less than about −3.3 are used, the yields of methyl perfluoroalkyl sulfones are favored and poor yields (less than 40%) of bis(perfluoroalkylsulfonyl)methane are obtained. Ethers forming oxonium ions having pKa's of less than −3.3 are diethylether, pKa −3.59; methyl n-propylether, pKa −3.79; methyl ethyl ether, pKa −3.82; dimethylether, pKa −3.83; diisopropylether, −4.30; and methyl phenyl ether, pKa −6.54.

The bis(perfluoroalkylsulfonyl)methanes are useful in the preparation of cationic catalysts for the polymerization of epoxides, vinylethers, N-vinyl compounds, aziridines and acetals as is taught in U.S. Pat. No. 3,586,616. The bis(perfluoroalkylsulfonyl)methanes are also useful for the preparation of organic intermediates.

The following examples serve to illustrate the process of the invention.

EXAMPLE 1

This example illustrates the preparation of bis(perfluoromethylsulfonyl)methane, $(CF_3SO_2)_2CH_2$, by the "normal" addition process of the invention.

A dry 2-liter flask, fitted with a stirrer, Dry Ice condenser, thermometer and gas inlet tube, is charged with 730 ml. of 3.0 molar methylmagnesium chloride (2.2 moles) in tetrahydrofuran (available from Arapahoe Chemicals, Inc.). Perfluoromethanesulfonyl fluoride (111 g.; 0.73 mole) is bubbled into the stirred solution over a period of one hour, controlling the rate of addition so that refluxing of the sulfonyl fluoride is not excessive. The temperature (exothermic reaction) of the reaction mixture is kept at 30 to 40° C. by intermittent external cooling. After the addition is complete, the mixture is first stirred at 35° C. for 1.5 hours, then at 50° C. for 0.5 hour and is then cooled to 25° C. and hydrolyzed by slow addition of 375 ml. of 3 N hydrochloric acid to give aqueous and organic phases. In larger scale preparations up to 12 N hydrochloric acid may be used. The hydrolysis is exothermic and accompanied by the evolution of methane during the first 10 ml. of acid addition.

After the addition of the acid, the upper organic phase is separated, discarding the aqueous phase, and the tetrahydrofuran and water removed by distillation. The organic residue is taken up in 300 ml. of diethyl ether and washed twice with 100 ml. of 3 N hydrochloric acid. Other solvents as $CHCl_3$ or $CH_2Cl_2$ are also useful and are preferred for larger batches. The ether layer is dried over over anhydrous magnesium sulfate and fractionally distilled. In repetitive runs, thereare obtained yields of 67 to 74% of the theoretic (68 to 75 g.) of bis(perfluoromethylsulfonyl)methane, B.P. 99–101° C./25 mm. and 4 g. of methyl perfluoromethyl sulfone.

When the above procedure is repeated using diethyl ether in place of tetrahydrofuran, bis(perfluoromethylsulfonyl)methane is obtained in yields of 5 to 15% of the theoretical whereas yields of methyl perfluoromethyl sulfone up to about 75% are obtained.

When the above procedure is repeated using diethyl ether in place of tetrahydrofuran the optimum ratio of methylmagnesium halide to perfluoromethanesulfonylfluoride is about 2:1 at which ratio bis(perfluoromethylsulfonyl)methane is obtained in a yield of about 34% of theoretical. At lower or higher ratios decreased yields of bis(perfluoromethylsulfonyl)methane and increased yields of methyl perfluoromethyl sulfone are obtained.

The procedure above is repeated using equivolume mixture (1:1) of benzene (anhydrous thiophene free) and tetrahydrofuran in place of tetrahydrofuran alone, a yield of about 54% of the bis(perfluoromethylsulfonyl)methane and 14.3% of the methyl perfluoromethyl sulfone is obtained.

When the preparation of bis(perfluoromethylsulfonyl)methane is carried out as above employing an equivolume mixture (1:1 of diethylether and tetrahydrofuran in place of tetrahydrofuran, a yield of about 50% of the theoretical of bis(perfluoromethylsulfonyl)methane is obtained.

EXAMPLE 2

This example illustrates the preparation of bis(perfluoromethylsulfonyl)methane, $(CF_3SO_2)_2CH_2$ by the "reverse" addition process of the invention.

A dry 2-liter flask, fitted with a stirrer, dry ice condenser and thermometer is cooled to −20° C. in a Dry Ice-acetone bath and charged with a solution of 100 g. (0.66 mole) of perfluoromethanesulfonyl fluoride in 250 ml. of tetrahydrofuran. Then, while stirring and maintaining the temperature at −23 to −15° C. there is added 286 ml. of 3.0 molar methylmagnesium bromide (0.86 mole; 1.3 moles of methylmagnesium bromide per mole of perfluoromethanesulfonyl fluoride) in diethylether over a period of one hour. After the addition is complete, the reaction is allowed to warm to room temperature and then is heated at about 35° for one hour. The mixture is hydrolyzed with 3 N hydrochloric acid and bis (perfluoromethylsulfonyl)methane is isolated as in Example 1 in a yield of 50% of the theoretical.

When the above procedure is repeated except for adding 130 ml. (0.39 mole) of methylmagnesium chloride in tetrahydrofuran to a solution of 42 g. (0.27 mole) of perfluoromethanesulfonyl fluoride in about 115 ml. of diisopropyl ether at −20° C., there is obtained a 60% yield of bis(perfluoromethylsulfonyl)methane.

EXAMPLE 3

This example illustrates the preparation of bis(perfluoromethylsulfonyl)methane on a much larger scale by the procedure of Example 1 ("normal" addition).

Example 1 is repeated using the same proportions of reactants (3 moles of methylmagnesium chloride per mole of perfluoromethanesulfonyl fluoride) and solvents as in Example 1 but at a larger scale (5.73 kg. perfluoromethanesulfonyl fluoride, 37.85 l. of 3 molar methylmagnesiumchloride in tetrahydrofuran) and maintaining the reactants under autogenous pressure using a relief valve to remove methane. The yield of bis(perfluoromethylsulfonyl)methane is about 86% of the theoretical (4.5 kg.).

When this procedure is repeated using 2.64 moles of methylmagnesium chloride per mole of perfluoromethanesulfonyl fluoride, there is obtained a yield of 77% of the theoretical of bis(perfluoromethylsulfonyl)methane and when 2.26 moles of methylmagnesium chloride are used per mole of perfluoromethanesulfonyl fluoride, a theoretical yield of 66% is obtained.

EXAMPLE 4

This example illustrates the preparation of bis(perfluorooctylsulfonyl)methane, $(C_8F_{17}SO_2)_2CH_2$ in accordance with the process of the invention.

A 3-liter flask equipped with stirrer, condenser and addition funnel is charged with 900 ml. of dry tetrahydrofuran and 310 g. (0.62 mole) of perfluorooctanesulfonyl fluoride (a mixture of about 80% straight chain and about 20% branched chain perfluorooctanesulfonyl fluoride as determined by nuclear magnetic resonance). There is then added 400 ml. of 3 molar methylmagnesium bromide (1.2 moles) in diethylether, controlling the reaction by rate of addition (2 hours) and application of external cooling. The resultant mixture is stirred while heating at reflux (about 35° C.) for 1 hour and then 500 ml. of solvents is distilled off. The reaction mixture is hydrolyzed by addition of 400 ml. of 6 N hydrochloric acid, poured into 3 liters of water and filtered. The solids obtained are washed with water and dried yielding 262 g. of crude bis(perfluorooctylsulfonyl)methane. The crude product is slurried with about 780 ml. of diethyl ether and filtered giving 183 g. of ether insoluble straight chain bis(perfluorooctylsulfonyl)methane, M.P. 161–165° C. By distillation of ether from the filtrate there is obtained 68 g. of product containing principally branched chain isomers of bis(perfluorooctylsulfonyl)methane and a small amount of methyl perfluorooctyl sulfone. The total yield of bis(perfluorooctylsulfonyl)methane is 80% of the theoretical.

When the procedure is repeated using 1300 ml. of diethyl ether in place of the mixture of tetrahydrofuran and ether there is obtained a yield of only 19% of the theoretical of bis(perfluorooctylsulfonyl)methane.

EXAMPLE 5

This example illustrates the preparation of bis(perfluorobutylsulfonyl)methane, $(C_4F_9SO_2)_2CH_2$, by the process of the invention.

Perfluorobutanesulfonyl fluoride (60 g.; 0.2 mole) is added over a period of 1.5 hours to a stirred solution of 200 ml., of 3.0 molar methylmagnesium chloride (0.6 mole) in tertrahydrofuran. During the addition the temperature of the mixture is maintained at 30–35° by intermittent cooling. After completion of the addition, the mixture is stirred at room temperature for one hour and then at 60° C. for one hour. The mixture is cooled to room temperature and hydrolyzed by the slow addition of aqueous HCl. The organic phase is separated, the aqueous phase extracted with diethyl ether, and the ether extract combined with the organic phase. The ether and tetrahydrofuran are removed by evaporation under reduced pressure. The residue is dissolved in diethyl ether and the solution washed with water. Evaporation of the ethereal solution (dried over anhydrous magnesium sulfate) under reduced pressure yields 41.2 g. of a very dark brown solid. Sublimation of the solid at 60–90° C. (0.05 mm.) gives 30.4 to 34.5 of bis(perfluorobutylsulfonyl)methane (59 to 67% theoretical yield), M.P. 85–90° and 6.7 g. of a residue which did not sublime at 145° C. Recrystallization from carbon tetrachloride gives highly pure bis(perfluorobutylslfonyl)methane, M.P. 99–100° C.

The proton nuclear magnetic resonance spectrum of bis(perfluorobutylsulfonyl)methane exhibits a single peak at 4.30τ for the protons of the methylene group. Elemental analysis of the compound is:

Calculated for $C_9H_2F_{18}O_4S_2$ (percent): C, 18.6; H, 0.4; F, 58.9. Found (percent): C, 18.5; H, 0.4; F, 58.9.

EXAMPLE 6

The process of the invention is carried out using a mole ratio of 7.2 moles of methylmagnesium chloride per mole of perfluoromethanesulfonyl fluoride by repeating the procedure of Example 1 using 600 ml. of 3.0 molar methylmagnesium chloride (1.8 moles) in tetrahydrofuran and 38 g. of perfluoromethanesulfonyl fluoride (0.25 mole). There is obtained a 55% yield of bis(perfluoromethylsulfonyl)methane. The large excess of methylmagnesium halide makes the isolation of product difficult.

EXAMPLE 7

Example 1 is repeated using 1,2 - dimethoxyethane (ethylene glycol dimethyl ether) containing about 10% diethyl ether in place of tetrahydrofuran. There is obtained a 55% yield of bis(perfluoromethanesulfonyl)methane.

EXAMPLE 8

Example 1 is repeated using 200 ml. of 1.5 molar methylmagnesium bromide (0.3 mole) in purified dioxane and 15.2 g. (0.1 mole) of perfluoromethanesulfonyl fluoride. There is obtained a 50 to 60% yield of bis(perfluoromethanesulfonyl)methane. The solubility of methylmagnesium bromide is poor in dioxane.

EXAMPLE 9

Example 1 is repeated using 120 ml. of 2.5 molar methylmagnesium bromide (0.3 mole) in 2-methyl tetrahydrofuran and 15.2 g. (0.1 mole) of perfluoromethylsulfonyl fluoride. There is obtained a 47% yield of bis-(perfluoromethylsulfonyl)methane.

What is claimed is:
1. An improved process for the production of bis(perfluoroalkylsulfonyl)methanes of the formula:

$$(R_fSO_2)_2CH_2$$

wherein $R_f$ is a monovalent fluorinated straight or branched chain alkyl radical containing 1–18 carbon atoms fully fluorinated except for not more than one of hydrogen, oxygen, trivalent nitrogen or chlorine atoms for each two carbon atoms, said hydrogen and chlorine atoms being non-reactive to methyl magnesium halide and oxygen and nitrogen being bonded exclusively to carbon, comprising the steps of
(I) reacting
(A) perfluoroalkansulfonyl fluoride of the formula:

$$R_f SO_2 F$$

wherein $R_f$ is as above defined with
(B) methylmagnesium halide in proportions of from about 1:1.2 to about 1:7 at temperatures in the range of from about $-20°$ to $+100°$ C. in a solvent system comprising at least about 40% by volume of an ether forming an oxonium ion in aqueous sulfuric acid having an ionization constant expressed by pKa of greater than $-3.3$ and up to about $-2.0$ as determined by solvent extraction and gas chromatography, whereby an organomagnesium complex compound is formed, the portion of said solvent system which is not an oxonium-forming ether being inert toward reactants and products, and
(II) hydrolyzing the organomagnesium complex compound and thereafter recovering bis(perfluoroalkylsulfonyl)methane.

2. The process according to claim 1 wherein the solvent system comprises at least 40% tetrahydrofuran.

3. The process according to claim 2 wherein perfluoromethane sulfonyl fluoride is reacted with methyl magnesium halide and bis(perfluoromethylsulfonyl)methane is recovered.

4. The process according to claim 2 wherein perfluorobutanesulfonyl fluoride is reacted with methyl magnesium halide and bis(perfluorobutylsulfonyl)methane is recovered.

5. The process according to claim 2 wherein perfluorooctanesulfonyl fluoride is reacted with methyl magnesium halide and bis(perfluorooctylsulfonyl)methane is recovered.

6. The process according to claim 1 wherein the methyl magnesium halide is methyl magnesium chloride.

7. The process according to claim 1 wherein perfluoroalkanesulfonyl fluoride is added to an excess of methyl magnesium halide in the solvent system.

8. The process according to claim 1 wherein methylmagnesium halide in ethereal solvent is added to an ethereal solution of perfluoroalkanesulfonyl fluoride.

9. An improved process for the production of bis(perfluoroalkylsulfonyl)methanes of the formula:

$$(C_n F_{2n+1} SO_2)_2 CH_2$$

wherein $n$ is an integer from 1 to 18 comprising the steps of
(I) reacting
(A) perfluoroalkanesulfonyl fluoride of the formula:

$$C_n F_{2n+1} SO_2 F$$

wherein $n$ is an integer from 1 to 18 with
(B) methyl magnesium halide in proportions of from about 1:1.2 to about 1:7 at temperatures in the range of from about $-2°$ to $+100°$ C. in a solvent system comprising at least about 40% by volume of an ether forming an oxonium ion in aqueous sulfuric acid having an ionization constant expressed by pKa of greater than $-3.3$ and up to about $-2.0$ as determined by solvent extraction and gas chromatography, whereby an organomagnesium complex compound is formed, the portion of said solvent system which is not oxonium-forming ether being inert toward reactants and products, and
(II) hydrolyzing the organomagnesium complex compound and thereafter recovering bis(perfluoroalkylsulfonyl)methane.

References Cited
UNITED STATES PATENTS 2,732,398   1/1956   Brice et al. _____ 260—607 A

OTHER REFERENCES

Gramstad et al.: "J. Chem. Soc." (1957), pp. 4609–78.

LEWIS GOTTS, Primary Examiner

D. R. PHILLIPS, Assistant Examiner

U.S. Cl. X.R.

260—247.1, 293.85, 583 EE

UNITED STATES PATENT OFFICE
CERTIFICATE OF CORRECTION

Patent No. 3,776,960          Dated December 4, 1973

Inventor(s) Robert J. Koshar et al.

It is certified that error appears in the above-identified patent and that said Letters Patent are hereby corrected as shown below:

Column 2, Line 31, "perfluoromerpholino" should read --perfluoromorpholino--.
Column 3, Line 64, "whenethers" should read --when ethers --.
Column 4, Line 36, delete "over", second occurrence.
Column 4, Line 37, "thereare" should read -- there are --.
Column 4, Line 38, "theoretic" should read --theoretical--.
Column 4, Line 61, "(1:1" should read --(1:1)--.
Column 8, Line 17, "-2°" should read -- -20° --.

Signed and sealed this 18th day of June 1974.

(SEAL)
Attest:

EDWARD M. FLETCHER, JR.
Attesting Officer

C. MARSHALL DANN
Commissioner of Patents